(12) United States Patent
Takeda

(10) Patent No.: US 9,333,697 B2
(45) Date of Patent: May 10, 2016

(54) PREFORM SUPPLYING APPARATUS

(71) Applicant: NISSEI ASB MACHINE CO., LTD., Nagano (JP)

(72) Inventor: Shinya Takeda, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 14/396,715

(22) PCT Filed: Apr. 24, 2013

(86) PCT No.: PCT/JP2013/062089
§ 371 (c)(1),
(2) Date: Oct. 23, 2014

(87) PCT Pub. No.: WO2013/161884
PCT Pub. Date: Oct. 31, 2013

(65) Prior Publication Data
US 2015/0118347 A1    Apr. 30, 2015

(30) Foreign Application Priority Data
Apr. 24, 2012  (JP) ................... 2012-099253

(51) Int. Cl.
*B29C 31/08*  (2006.01)
*B29C 49/42*  (2006.01)
(Continued)

(52) U.S. Cl.
CPC ............. *B29C 49/4205* (2013.01); *B29C 31/08* (2013.01); *B65G 11/163* (2013.01);
(Continued)

(58) Field of Classification Search
CPC ................... B29C 49/4205; B29C 2049/4231; B29C 31/08; B65G 11/163
USPC ............................................ 193/2 R
See application file for complete search history.

(56) References Cited

U.S. PATENT DOCUMENTS 3,650,723 A * 3/1972 Wiley ................. C03B 7/16
                                                    65/169
3,710,924 A * 1/1973 Schultz ............. B65G 47/1457
                                                    198/391
(Continued)

FOREIGN PATENT DOCUMENTS

CH          698447 B1 *  8/2009 ........ B29C 49/4205
CN          1053039         7/1991
(Continued)

OTHER PUBLICATIONS

International Search Report, International Application No. PCT/JP2013/062089, dated Aug. 6, 2013.
(Continued)

*Primary Examiner* — Robert B Davis
(74) *Attorney, Agent, or Firm* — David L. Hoffman; Hoffman Patent Group

(57) ABSTRACT

A preform supplying apparatus of the invention includes an alignment guidance chute (80) having a guide member (83, 84) that slides a plurality of preforms (P) under their own weight by inclination and guides the preforms to a preform alignment conveyance unit (39), and the preform alignment conveyance unit (39) that conveys the preforms (P) guided from the alignment guidance chute (80) in an aligned state, and groove parts along an inclination direction are formed to the guide members (83, 84) and inner wall surfaces of the groove parts have shapes which causes the preforms (P) sliding down inside the groove parts to be aligned in a line.

10 Claims, 10 Drawing Sheets

(51) Int. Cl.
  *B65G 11/16* (2006.01)
  *B29C 49/06* (2006.01)
  *B29B 11/14* (2006.01)
  *B29L 31/00* (2006.01)
  *B29K 105/00* (2006.01)

(52) U.S. Cl.
  CPC ...... *B29B 11/14* (2013.01); *B29B 2911/14366* (2013.01); *B29B 2911/14446* (2013.01); *B29C 49/06* (2013.01); *B29C 2049/4231* (2013.01); *B29K 2105/258* (2013.01); *B29L 2031/716* (2013.01)

(56) References Cited

U.S. PATENT DOCUMENTS

| | | | |
|---|---|---|---|
| 5,065,852 A | 11/1991 | Marti | |
| 5,236,077 A * | 8/1993 | Hoppmann | B65G 47/1471 198/380 |
| 5,370,216 A * | 12/1994 | Tsuruyama | B25J 9/1697 198/376 |
| 5,769,203 A | 6/1998 | Sala | |
| 6,457,967 B1 | 10/2002 | Suzuki et al. | |
| 6,776,011 B2 * | 8/2004 | Hayes | C03B 7/16 193/2 R |
| 7,322,458 B1 * | 1/2008 | McDonald | B29C 49/4205 198/389 |
| 8,109,381 B2 * | 2/2012 | Deyerl | B29C 49/4205 198/389 |
| 8,136,651 B2 * | 3/2012 | Cassoni | B67B 3/0645 198/380 |
| 8,337,193 B2 * | 12/2012 | Brown | B29C 49/4205 198/389 |
| 2007/0108018 A1 | 5/2007 | Charpentier | |
| 2009/0155036 A1 * | 6/2009 | Deyerl | B29C 49/4205 414/539 |

FOREIGN PATENT DOCUMENTS

| | | | |
|---|---|---|---|
| CN | 1131633 | 9/1996 | |
| CN | 201198099 | 2/2009 | |
| DE | 102009016593 A1 * | 10/2010 | ......... B29C 49/4205 |
| JP | 2000-117821 | 4/2000 | |
| JP | 2004-034388 | 2/2004 | |
| JP | 3131813 | 4/2007 | |
| JP | 2007516115 A | 6/2007 | |
| JP | 2012-071453 | 4/2012 | |

OTHER PUBLICATIONS

Chinese Office Action for Patent Application No. 2013800216847, Dated Nov. 26, 2015 (14 Pages).

* cited by examiner

PREFORM SUPPLYING APPARATUS

This application is a U.S. national stage application of International Patent Application No. PCT/JP2013/062089, having an international filing date of Apr. 24, 2013, which designated the United States and which claims priority from Japanese Patent Application No. 2012-099253, filed on Apr. 24, 2012, the entirety of both of which are incorporated herein by reference.

TECHNICAL FIELD

The present invention relates to a preform supplying apparatus including an alignment guidance chute that aligns a plurality of preforms and also guides the preforms to a preform alignment conveyance unit.

BACKGROUND ART

Conventionally, there is a preform supplying apparatus in which, in a container manufacturing factory, a drink factory, etc., a bottomed preform of a PET raw material molded by an injection molding machine is accommodated in a container for preform, and then the preform accommodated in the container is taken out by means such as a belt conveyor and a supply posture of the preform is aligned and the preform is supplied to a blow molding machine in a single-line state by a preform alignment conveyance unit.

As one example of such a preform supplying apparatus, Patent Reference 1 discloses an example in which a preform guidance shoot is provided between a belt conveyor and a preform alignment conveyance (see Patent Reference 1).

PRIOR ART REFERENCE

Patent Reference

Patent Reference 1: JP-Y-3131813

SUMMARY OF THE INVENTION

Problems that the Invention is to Solve

The preform has a plurality of kinds of shapes according to use of a container formed after blow molding. For example, a narrow-mouthed preform with an elongated cylindrical shape having a mouth part relatively small with respect to a trunk is often used as a preform which is blow-molded into a drink bottle. On the other hand, a preform blow-molded into a container of food or cosmetics has various shapes and, for example, a wide-mouthed preform having a mouth part relatively large with respect to the trunk is used.

However, according to the preform guidance chute of Patent Reference 1, for narrow-mouthed preforms, the preforms can be aligned and guided to the preform alignment conveyance unit while regulating flow postures of many preforms, but for wide-mouthed preforms, the center of gravity is in the vicinity of the center of the preform and it is difficult to regulate the flow posture, with the result that the preform may be guided to the vicinity of an inlet of the preform alignment conveyance unit in a state of an overturned posture. In this case, the preform in the overturned state is not guided to a gap between a pair of rollers of the preform alignment conveyance unit and accumulates in the vicinity of the near side of the rollers. When a large number of preforms accumulate in the middle of a conveyance path, it becomes necessary to stop operation of the preform supplying apparatus and do work of removing the accumulating preforms, which leads to deterioration in supply efficiency.

The invention has been implemented in view of the problem described above, and an object of the invention is to provide a preform supplying apparatus in which even for a wide-mouthed preform, the preform can be effectively supplied to a machine for the next step such as a blow molding machine in an aligned state.

Means for Solving the Problems

In order to achieve the object described above, a preform supplying apparatus of the invention includes an alignment guidance chute having a guide member that slides a plurality of preforms under their own weight by inclination and guides the preforms to a preform alignment conveyance unit, and the preform alignment conveyance unit that conveys the preforms guided from the alignment guidance chute in an aligned state, and a groove part along an inclination direction is formed to the guide member and an inner wall surface of the groove part has a shape which causes the preforms sliding down inside the groove part to be aligned in a line.

It is preferable that the shape of the inner wall surface of the groove part is a semi-cylindrical shape.

It is preferable that the preform alignment conveyance unit has a pair of alignment rollers extending in parallel along a conveyance direction, and the pair of alignment rollers conveys a preform while supporting the preform by pinching a trunk part of the preform guided from the alignment guidance chute.

It is preferable that the alignment guidance chute has a plate-shaped member on which a preform slides down from a downstream side end of the groove part toward the alignment rollers.

It is preferable that a fall chute, through which a preform conveyed from a container that stores a plurality of preforms falls and passes, is installed at an upper side of an upstream side end of the alignment guidance chute, and the fall chute has a pin that collides with the preform falling from an upper side.

It is preferable that the preform alignment conveyance unit has an air jet part that blows off a preform in a misaligned state to an outside of a conveyance path of the preform alignment conveyance unit.

It is preferable that an impeller that bounces off at least two or more preforms, which are conveyed while being stacked, to an upstream side is installed to a downstream side end of the preform alignment conveyance unit, and the air jet part blows off the preforms bounced off by the impeller to the outside of the conveyance path of the preform alignment conveyance unit.

Advantage of the Invention

According to the preform supplying apparatus of the invention, since the plurality of preforms slide down while being aligned in a line along the inner wall surface of the groove part formed in the guide member, the preforms hardly interfere with other preforms while sliding down. As a result, the flow posture of the preform sliding down tends to be aligned in a state in which the bottom side (the gravity center side) of the preform faces the downstream side. That is, the frequency at which the preform sliding down is guided to the preform alignment conveyance unit in an overturned state is decreased.

MODE FOR CARRYING OUT THE INVENTION

One example of an embodiment of the invention will hereinafter be described with reference to the accompanying drawings.

Figure 1:
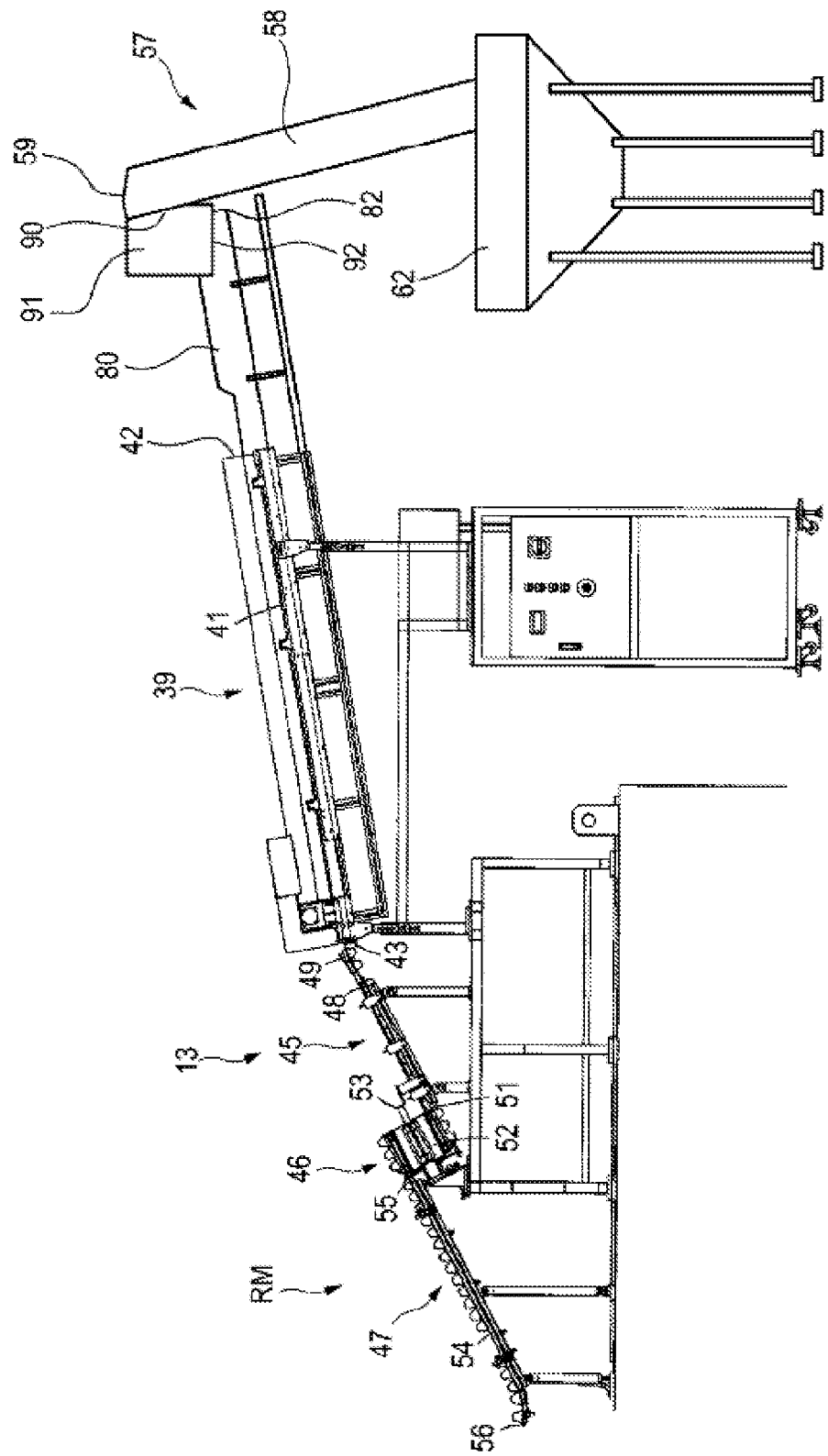
FIG. 1 is a side view showing an external appearance of a preform supplying apparatus according to an embodiment.

FIG. 1 shows a schematic configuration of a preform supplying apparatus 13. As shown in FIG. 1, the preform supplying apparatus 13 includes a preform alignment conveyance unit 39 and an alignment guidance chute 80. Also, in order to more improve an alignment capability, a fall chute 90 is further included. The preform supplying apparatus 13 is coupled to an inclined conveyor 57 for taking out preforms P stored in a container 62 for preform, and supplies the preforms P conveyed from the inclined conveyor 57 to a reversing apparatus RM while aligning the plurality of misaligned preforms P.

The preform alignment conveyance unit 39 includes an alignment path 41 (one example of a conveyance path) inclined at a predetermined inclination angle. The alignment path 41 includes an inlet end 42 and an outlet end 43. The inlet end 42 is positioned at a position higher than the outlet end 43 in a direction of gravity. The plurality of preforms P sliding down from the alignment guidance chute 80 to the inlet end 42 are supplied to the alignment path 41. In the alignment path 41, the preforms P are aligned in a line in an upright posture. The preforms P in the upright posture are discharged from the outlet end 43 one by one.

Figure 2:
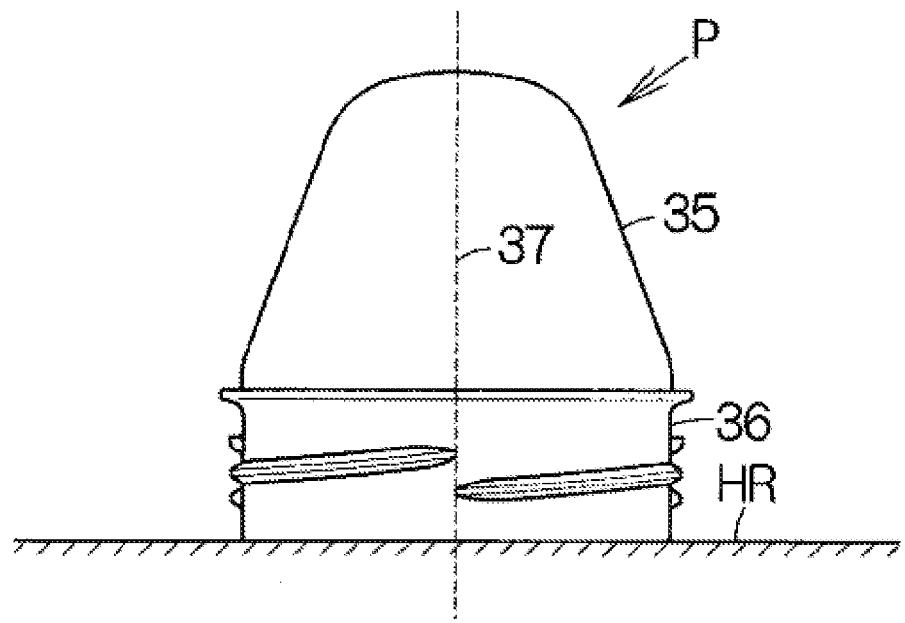
FIG. 2 is a side view showing a preform in an inverted posture.

Since the preform P includes a mouth part 36 relatively large with respect to a bottomed trunk 35 as shown in FIG. 2, the preform P can be self-supported in an inverted posture on a horizontal plane HR. The mouth part 36 is formed cylindrically. Screw threads are formed on an outer peripheral surface of the mouth part 36. The central axis 37 of the preform P, that is, the central axis 37 of the mouth part 36 is orthogonal to the horizontal plane HR. Moreover, since the height of the trunk 35 is set relatively low with respect to the size of the mouth part 36, the preform P becomes stable in the inverted posture.

Figure 3:
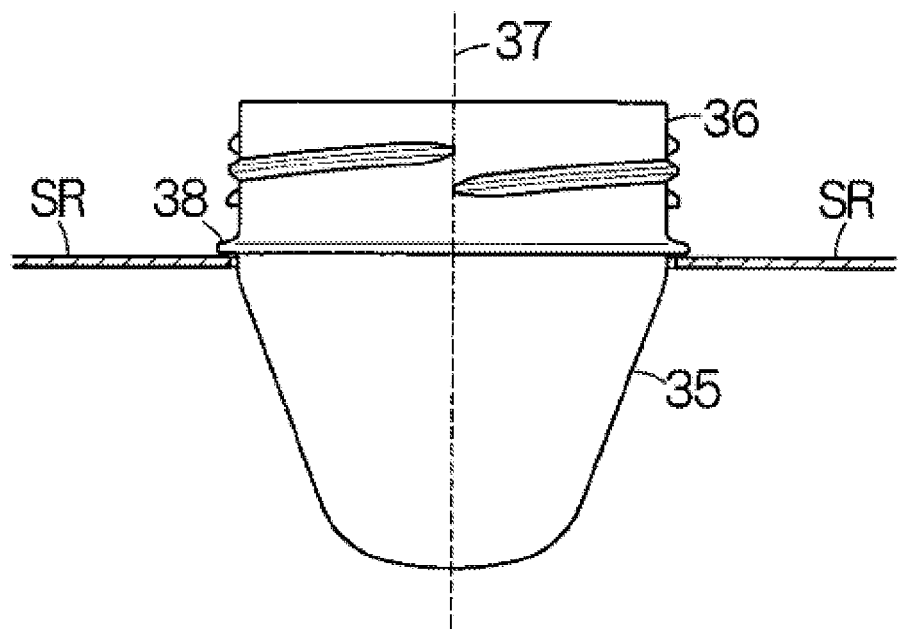
FIG. 3 is a side view showing a preform in an upright posture.

On the other hand, since a bottom surface of the trunk 35 of the preform P has roundness as shown in FIG. 3, the preform P in an upright posture cannot be self-supported in an erected posture on the horizontal plane HR. That is, the preform P in the upright posture cannot be held on the horizontal plane HR with the central axis 37 of the mouth part 36 being orthogonal to the horizontal plane HR.

In the preform P, the so-called support ring, that is, a flange 38 is formed between the mouth part 36 and the trunk 35. The flange 38 extends outwardly along a plane orthogonal to the central axis 37 of the mouth part 36. When the preform P is supported by horizontal planes SR separated at a predetermined distance at the flange 38, the trunk 35 of the preform P is inserted between the mutual horizontal planes SR. The central axis 37 of the mouth part 36 can be orthogonal to the horizontal planes SR. Here, FIG. 3 shows an example in which the flange 38 has the maximum outside diameter of the preform P and also serves as a support surface, but as long as the preform P includes a surface capable of being supported by the preform alignment conveyance unit 39, the preform P may have any shape. For example, the flange 38 may be lower than the screw thread, the preform P may have the shape including a recess thinned to the center side between the screw thread and the trunk 35, or the preform P may have the shape in which the flange 38 is formed to a mouth part end upper than the screw thread. In addition, in the inverted posture, the mouth part 36 is opened downwardly. To the contrary, in the upright posture, the mouth part 36 is opened upwardly. Also, in the wide-mouthed preform P of the present example, a ratio (ratio of a diameter of the mouth part to the total length) of a mouth diameter to the total length (length from the mouth part to the bottom part) becomes about ½ or more, and is remarkably larger than a value of a normal narrow-mouthed preform used in molding of a 500 ml bottle (for example, ¼). Further, while the center of gravity of the narrow-mouthed preform is located nearer to the bottomed part side, that is, in a position away from an end face of the mouth part, the center of gravity of the wide-mouthed preform P is located at almost the center position nearer to the end face of the mouth part. As a result, even when the wide-mouthed preform P is slid on an inclined surface simply, it is difficult to align the wide-mouthed preform P in a posture in which the bottomed part is turned downwardly.

Figure 4:
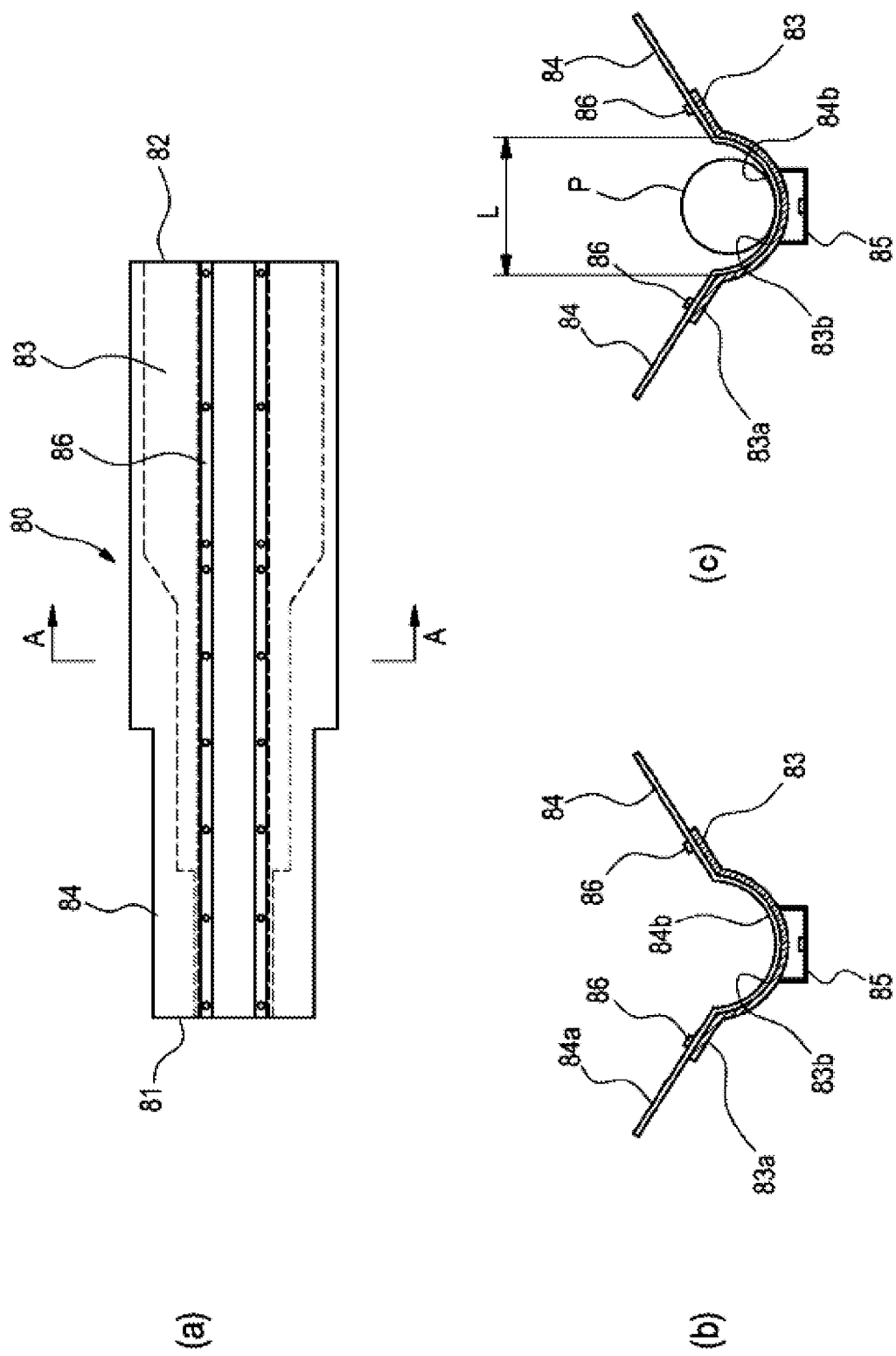
FIG. 4(a) is a plan view of an alignment guidance chute.
FIG. 4(b) is a sectional view taken on line A-A in FIG. 4(a)
FIG. 4(c) is a view showing a state in which a preform is placed on a groove part in FIG. 4(b).

As shown in FIGS. 4(a) to 4(c), the alignment guidance chute 80 includes a plate-shaped member 83 (one example of a guide member) made of stainless steel having a substantially semi-cylindrical groove in the center, and a sheet member 84 (one example of a guide member) made of Teflon (registered trademark) fixed on a surface (upper side surface) of the plate-shaped member 83 along a shape of the plate-shaped member 83 by fixing members 86. As shown in FIG. 4(b), the plate-shaped member 83 includes an inclined part 83a inclined so as to become low toward the center of the plate-shaped member 83, and substantially a semi-cylindrical groove part 83b. The sheet member 84 has an inclined part 84a inclined so as to become low toward the center along the inclined part 83a of the plate-shaped member 83, and a groove part 84b with a shape bent in a substantially semi-cylindrical shape downwardly along the groove part 83b of the plate-shaped member 83. The fixing members 86 are rectangular plate-shaped members made of metal, and fix the sheet member 84 so as to pinch the sheet member 84 between the plate-shaped member 83 and the fixing members 86.

FIG. 4(c) is a sectional view taken on line A-A in FIG. 4(a), and shows a state in which the preform P is placed on the sheet member 84. A width L of substantially the semi-cylindrical groove part 83b formed in the center of the plate-shaped member 83 is larger than the maximum outside diameter of the preform P but is smaller than two times the maximum outside diameter. Consequently, the groove part 84b of the sheet member 84 fixed along the shape of the plate-shaped member 83 also has a width substantially similar to that of the groove part 83b of the plate-shaped member 83, and inside the groove part 84b of the sheet member 84, one preform P is received while having a slight gap (width of the extent to which two preforms P cannot flow in parallel) in both sides. Numeral 85 shows a support member 85 for supporting the sheet member 84 from the back side (surface which does not make contact with the preform P) of the sheet member 84 through the plate-shaped member 83.

The front surface (upper side surface) of the groove part 84b of the sheet member 84 corresponds to an inner wall surface, and is a surface making contact with the preform P sliding down to the downstream side. The alignment guidance chute 80 includes an inlet end 82 and an outlet end 81, and the inlet end 82 is positioned at a position higher than the outlet end 81 in a direction of gravity. That is, the alignment guidance chute 80 is inclined so as to become low toward the downstream side of a conveyance direction of the preform, and the groove part 84b is formed along an inclination direction.

Among the plurality of preforms P falling from the fall chute 90 on the alignment guidance chute 80, the preform P falling on the inclined part 84a of the sheet member 84 slides down toward the groove part 84b of the sheet member 84 under its own weight. The preform P received in the groove part 84b slides down on the inner wall surface of the groove part 84b toward the outlet end 81 under its own weight. In this manner, the plurality of falling preforms P whose directions are misaligned are aligned in a line and also are guided to the preform alignment conveyance unit 39.

Figure 5:
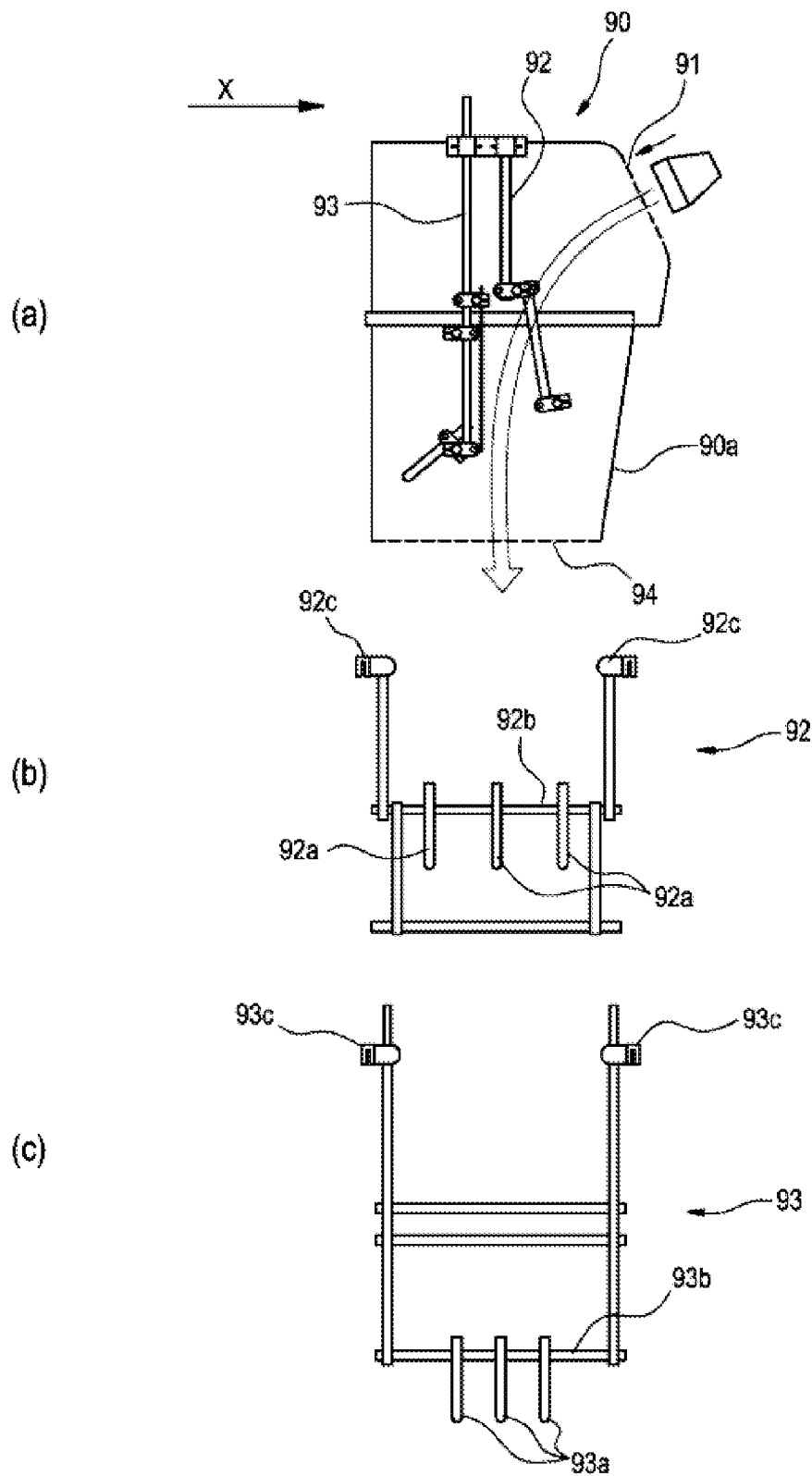
FIG. 5(a) is a longitudinal sectional view of a fall chute.
FIG. 5(b) is a front view of a first orientation member.
FIG. 5(c) is a front view of a second orientation member.

FIG. 5(a) shows a longitudinal sectional view of the fall chute 90. The fall chute 90 is installed at an upper side of the vicinity of the upstream side end (inlet end 82) of the alignment guidance chute 80 (see FIG. 1). The fall chute 90 includes a box-shaped cabinet 90a, a first orientation member 92 and a second orientation member 93 that collides with the preform P falling inside the cabinet 90a. The cabinet 90a includes a first opening 91 formed in a side surface at the side of the inclined conveyor 57 in the cabinet 90a, and a second opening 94 opened toward the vicinity of the upstream side end of the alignment guidance chute 80.

FIG. 5(b) is a view (also called a front view) seeing the first orientation member 92 in a direction of arrow X of FIG. 5(a). The first orientation member 92 is constructed by combining a plurality resin pins, and has pins 92c fixed and supported to the cabinet 90a and a plurality orientation pins 92a pivoted in a support pin 92b. The orientation pins 92a of the plurality of pins are arranged on a fall path of the preform P falling inside the cabinet 90a. A spacing between the plurality of orientation pins 92a is set larger than the maximum outside diameter of the preform P, and the preform P is prevented from clogging inside the cabinet 90a.

FIG. 5(c) is a view (also called a front view) seeing the second orientation member 93 in the direction of arrow X of FIG. 5(a). The second orientation member 93 is constructed by combining a plurality resin pins, and has pins 93c fixed and supported to the cabinet 90a and a plurality of orientation pins 93a pivoted in a support pin 93b.

When the plurality of misaligned preforms P conveyed from the inclined conveyor 57 pass through the inside of the cabinet 90a of the fall chute 90, the preforms P fall while colliding with the orientation pins 92a, 93a or other pins. In addition, since the first orientation member 92 and the second orientation member 93 are formed so that arrangement, a direction or the number of pins can be adjusted, the first orientation member 92 and the second orientation member 93 can be properly changed according to the size, the shape of the preform P or the amount of supply from the inclined conveyor 57.

Returning to FIG. 1, the inclined conveyor 57 includes a transport path 58 inclined at a predetermined inclination angle. As the inclination angle of the inclined conveyor 57 is larger with respect to the ground, an installation area of the inclined conveyor 57 becomes smaller. The transport path 58 is connected to the first opening 91 of the fall chute 90 at an ending point 59. A starting point 61 of the transport path 58 is coupled to the bottom of the container 62 for preform (one example of a container). The plurality of preforms P are stored in the container 62 for preform. The inclined conveyor 57 scoops up the preform P from the container 62 for preform. The inclined conveyor 57 transports the preform P from the container 62 for preform to the preform alignment conveyance unit 39 through the fall chute 90 and the alignment guidance chute 80. Thus, according to combination of the inclined conveyor 57, the fall chute 90, the alignment guidance chute 80, the preform alignment conveyance unit 39 and the container 62 for preform, it is unnecessary to previously align the preforms P in a line by hand before a blow molding machine of the next step. Accordingly, hand work is minimized and work efficiency is improved.

Figure 6:
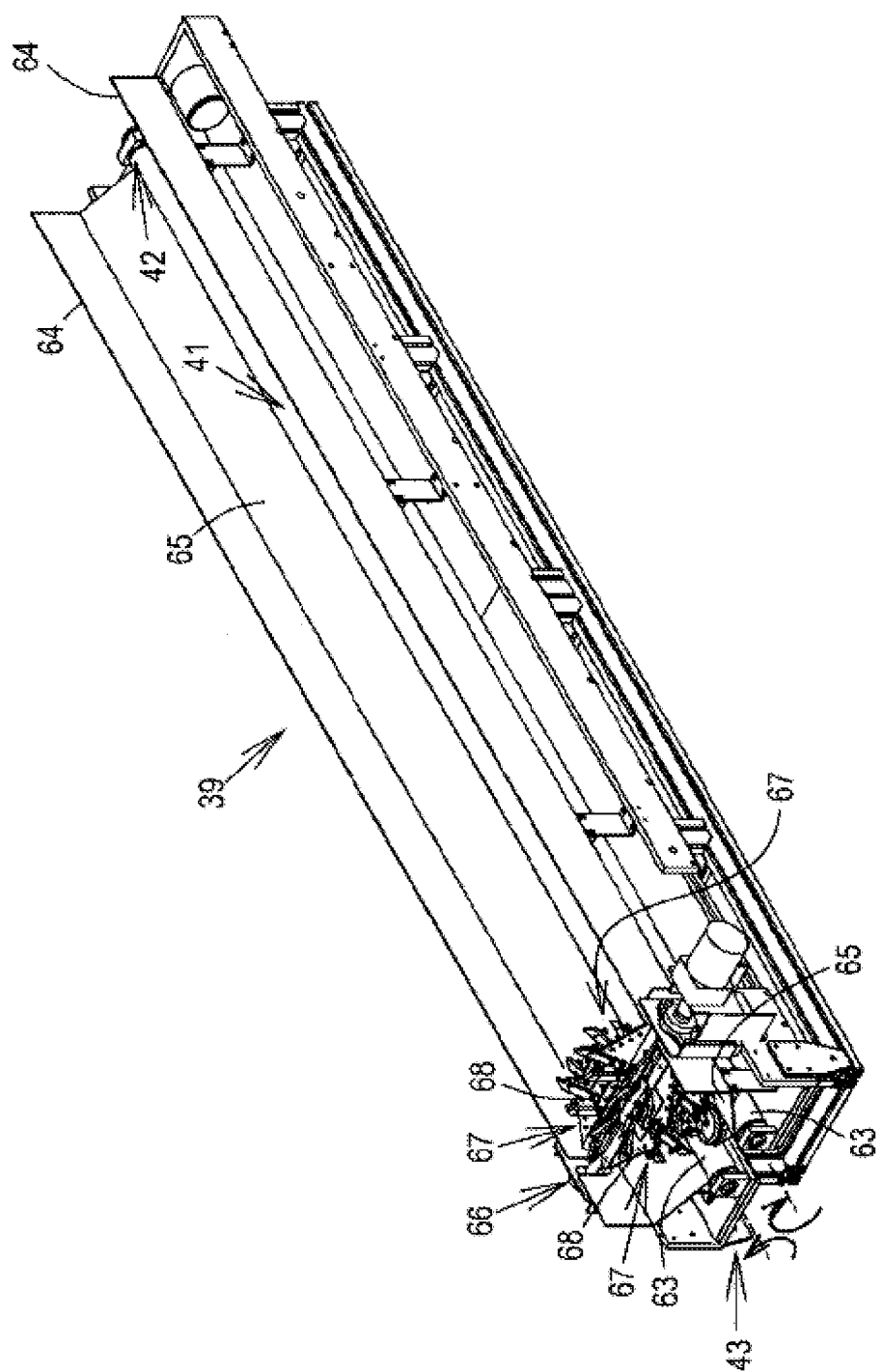
FIG. 6 is a perspective view schematically showing a structure of a preform alignment conveyance unit.

Next, a structure of the preform alignment conveyance unit 39 will be briefly described with reference to FIG. 6. The preform alignment conveyance unit 39 includes a pair of rollers 63 (one example of an alignment roller). The rollers 63 extend in parallel mutually. The shaft center of the roller 63 is orthogonal to one common horizontal line. A gap is formed between the mutual rollers 63. The gap could be set smaller than an outside diameter of the flange 38 of the preform P, that is, the maximum outside diameter of the preform. In the embodiment, the gap is set so that the rollers 63 convey the preform P while pinching a trunk part of the preform P. As a result, even for the preform P without the flange 38, the preform alignment conveyance unit 39 can perform conveyance and alignment processing. That is, the rollers 63 are rotated in opposite directions mutually around the shaft center. According to the rotation, outer surfaces of the rollers 63 trace space of the gap upwardly. The rollers 63 form the alignment path 41 described above. The preform P gradually moves downwardly from the inlet end 42 to the outlet end 43 of the alignment path 41 by action of gravity. A posture of the preform P is changed by action of rotation of the rollers 63 during the downward movement. Moreover, the preforms P are arranged in a line between the mutual rollers 63 since the gap between the rollers 63 is less than the size of one preform P.

The preform alignment conveyance unit 39 includes guide parts 64. The guide parts 64 are arranged at an upper side of the rollers 63. The guide part 64 has a guide surface 65 extending in parallel with the shaft center of the roller 63. A gap between the guide surfaces 65 becomes gradually narrower as the guide surfaces 65 are nearer to the rollers 63. The guide parts 64 guide the preform P toward the gap between the mutual rollers 63.

An impeller 66 is arranged at the front of the outlet end 43 of the alignment path 41. The impeller 66 is rotated around a horizontal shaft. The impeller 66 includes rotary vanes 67. The rotary vanes 67 are, for example, equally spaced around the horizontal shaft. Here, for example, 12 rotary vanes 67 are attached. The rotary vanes 67 are rotated so as to trace space of the gap between the mutual rollers 63 from the downward side to the upward side.

Figure 7:
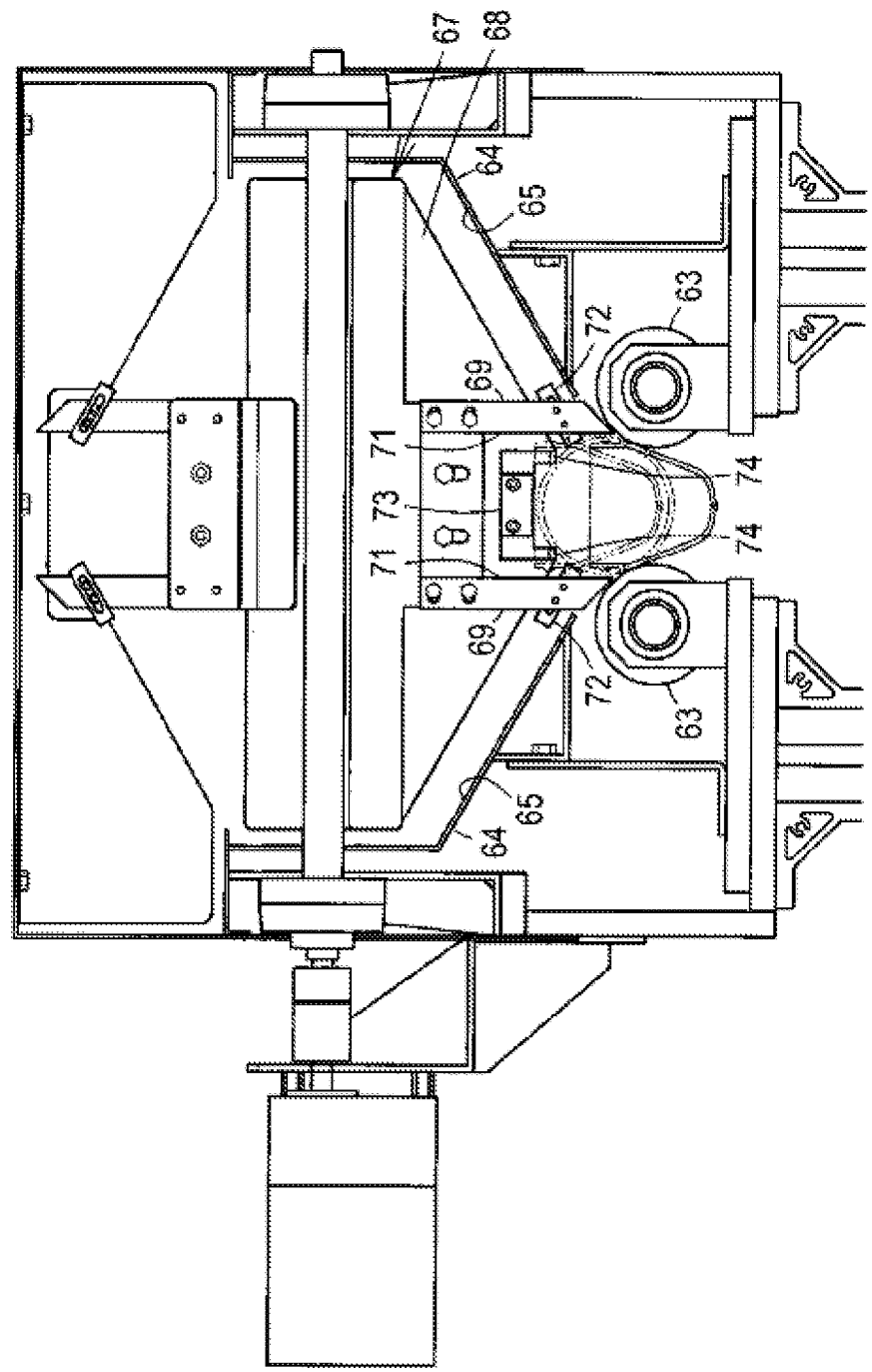
FIG. 7 is a detailed front view showing a structure of an impeller.

Each of the rotary vanes 67 includes a vane body 68. The rotary vane 67 is coupled to the horizontal shaft, that is, a rotary shaft in the vane body 68. The vane body 68 extends along a virtual plane including one radiation line of the rotary shaft. As shown in FIG. 7, a pair of right and left first claw members 69 in front view is attached to the vane body 68. The first claw members 69 may be fixed by, for example, screws. The first claw members 69 are spaced at a predetermined distance in a horizontal direction. The first claw members 69 are mutually opposed at vertical surfaces 71. The vertical surface 71 is formed by a plane extending in parallel with the shaft center of the roller 63. A distance between the mutual vertical surfaces 71 is set in the size obtained by adding a predetermined gap to the maximum outside diameter of the preform P. Consequently, when one preform P correctly enters the gap between the mutual rollers 63 in an upright posture, the preform P can pass through the portion between the first claw members 69.

In each of the rotary vanes 67, auxiliary claw members 72, which respectively correspond to the pair of first claw members 69, are attached to the pair of first claw members 69. The auxiliary claw members 72 may be fixed by, for example, screws. The tops of the auxiliary claw members 72 project from the corresponding vertical surfaces 71 in mutually approaching directions. As shown in FIG. 7, the tops of the auxiliary claw members 72 are arranged outwardly from the outline of the preform P correctly entering the gap between the mutual rollers 63 in the upright posture. Consequently, when one preform P correctly enters the gap between the mutual rollers 63 in the upright posture, the preform P can pass through the portion between the auxiliary claw members 72. On the other hand, the tops of the auxiliary claw members 72 abut on the outline of the preform P entering the gap between the mutual rollers 63 in an overturned posture, that is, the preform P which is supported in the gap between the mutual rollers 63 and in which the central axis 37 thereof is arranged in parallel with the shaft center of the roller 63. Consequently, when the preform P is supported in the gap between the mutual rollers 63 in the overturned attitude, the preform P is bounced up by the auxiliary claw members 72. The preform P is bounced up to the upstream side of the alignment path 41.

In a particular rotary vane 67, one second claw member 73 is attached to the vane body 68. The second claw member 73 may be fixed by, for example, screws. The second claw member 73 is arranged between mutual virtual vertical surfaces including the vertical surfaces 71. The second claw member 73 includes a pair of claws 74. The second claw member 73 is arranged outwardly from the outline of the preform P correctly entering the gap between the mutual rollers 63 in the upright posture. Consequently, when one preform P correctly enters the gap between the mutual rollers 63 in the upright posture, the preform P can pass through the second claw member 73. On the other hand, the tops of the claws 74 are arranged in a position colliding with the preforms P entering the gap between the mutual rollers 63 in a stacked state in the upright posture. Consequently, even when the preform P is in the upright posture, the preform P is bounced up by the claws 74 when two or more preforms P are held in the gap between the mutual rollers 63 with the preforms P being stacked. The second claw member 73 may be attached to, for example, all the rotary vanes 67, and may be, for example, alternately attached to only the particular rotary vanes 67.

When the preform P is held in the gap between the mutual rollers 63 in a posture other than the upright posture, the preform P is bounced up by the rotary vane 67 of the impeller 66. The preform P is bounced up to the upstream side of the alignment path 41. Even when the preform P is in the upright posture, the preform P is bounced up by the rotary vane 67 of the impeller 66 when two or more preforms P are held in the gap between the mutual rollers 63 with the preforms P being stacked. Thus, the preform P is again exposed to action of the rollers 63. When one preform P correctly enters the gap between the mutual rollers 63 in the upright posture, the preform P passes through the downward side of the rotary vane 67. Contact between the rotary vane 67 and the preform P is avoided. The preform P can come to the outlet end 43 of the alignment path 41.

Figure 8:
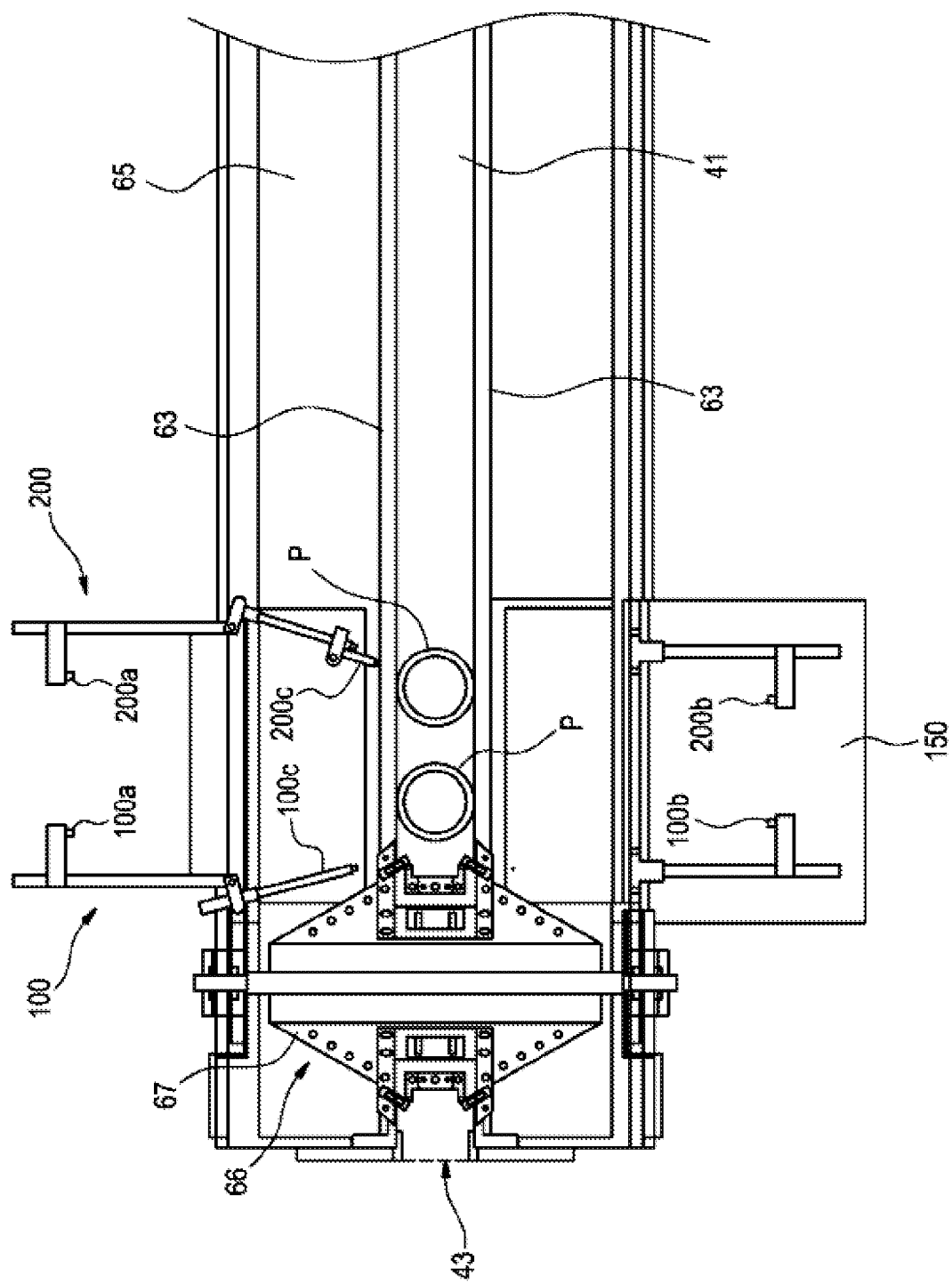
FIG. 8 is a view showing arrangement of air jet units.

FIG. 8 is a view showing arrangement of a first air jet unit 100 (one example of an air jet part) and a second air jet unit 200 (one example of the air jet part), and is a partially enlarged view of the downstream side end of the preform alignment conveyance unit 39. As shown in FIG. 8, the first air jet unit 100 and the second air jet unit 200 are installed in front of the vicinity of the upstream side of the impeller 66 of the preform alignment conveyance unit 39.

The first air jet unit 100 includes an optical sensor 100*a* having a light emitting element (floodlighting element) and a light receiving element as one example of a preform detection mechanism for detecting the presence or absence of preform P, a reflective plate 100*b* installed as opposed to the optical sensor 100*a* with the alignment path 41 located therebetween, and an air jet 100*c* for jetting compressed air according to an output signal of the optical sensor 100*a*.

The light emitting element of the optical sensor 100*a* is for emitting light horizontally toward the reflective plate 100*b*, and is installed to the preform alignment conveyance unit 39 so that the light passes through the height high from the roller 63 by a predetermined distance. The reflective plate 100*b* is for reflecting light emitted by the light emitting element of the optical sensor 100*a* toward the light receiving element of the optical sensor 100*a*. When the light emitted from the light emitting element returns to the light receiving element through the reflective plate 100*b*, the optical sensor 100*a* does not output an output signal (command signal) in order to operate the air jet 100*c*. On the other hand, when the light emitted from the light emitting element is halfway blocked by an obstacle (for example, a mass of the plurality of preforms P accumulating in a misaligned direction in front of the vicinity of the upstream side of the impeller 66, or the preform P conveyed in a misaligned state, that is, so that the trunk 35 rolls on the rollers 63 without being pinched between the rollers 63) and does not return to the light receiving element, the optical sensor 100*a* outputs an output signal (command signal) for operating the air jet 100*c* to the air jet 100*c*. In addition, in a path through which the light emitted by the light emitting element passes, the light passes through a position higher than the highest end of the preform P conveyed by the rollers 63 in the upright posture by a predetermined distance, and the preform P conveyed in the upright posture is not detected by the optical sensor 100*a*.

Also, the second air jet unit 200 is installed at the upstream side by a predetermined distance beyond the first air jet unit 100, and includes an optical sensor 200*a* having a light emitting element (floodlighting element) and a light receiving element as one example of the preform detection mechanism for detecting the presence or absence of the preform P, a reflective plate 200*b* installed as opposed to the optical sensor 200*a* with the alignment path 41 located therebetween, and an air jet 200c for jetting compressed air according to an output signal of the optical sensor 200a.

The light emitting element of the optical sensor 200a is for emitting light horizontally toward the reflective plate 200b, and is installed to the preform alignment conveyance unit 39 so that this light passes through the height high from the roller 63 by a predetermined distance. The reflective plate 200b is for reflecting light emitted by the light emitting element of the optical sensor 200a toward the light receiving element of the optical sensor 200a. When the light emitted from the light emitting element returns to the light receiving element through the reflective plate 200b, the optical sensor 200a does not output an output signal (command signal) in order to operate the air jet 200c. On the other hand, when the light emitted from the light emitting element is halfway blocked by an obstacle (for example, the preform bounced off by the impeller 66) and does not return to the light receiving element, the optical sensor 200a outputs an output signal (command signal) for operating the air jet 200c to the air jet 200c. In addition, in a path through which the light emitted by the light emitting element passes, the light passes through a position higher than the highest end of the preform P conveyed by the rollers 63 in the upright posture by a predetermined distance, and the preform P conveyed in the upright posture is not detected by the optical sensor 200a.

As described above, for example, when one preform P correctly enters the gap between the mutual rollers 63 and is conveyed in the upright posture, the optical sensor 100a and the optical sensor 200a do not detect any preform, and the air jet 100c and the air jet 200c are not operated.

Also, even when two preforms P are conveyed in the upright posture in a state in which the preforms P are tightly stacked in the same direction mutually (a fitted state which cannot be dissolved by the claws 74 of the impeller 66, and hereinafter, also referred to as a fitted state preform P), the fitted state preform P passes through the downward side of a path of light emitted by the optical sensor 100a and the optical sensor 200a, and reaches the impeller 66. Then, the fitted state preform P reaching the impeller 66 is bounced off toward the upward side of the upstream side of the impeller 66 by the rotary vanes 67 of the impeller 66. The fitted state preform P bounced off may pass through a path of light emitted by the light emitting element of the optical sensor 200a during the fall toward the alignment path 41. In this case, the optical sensor 200a outputs an output signal to the air jet 200c, and the air jet 200c jets compressed air toward the fitted state preform P being bounced off.

When the compressed air hits the fitted state preform P bounced off, the fitted state preform P is blown off toward an outlet guide member 150 installed to the preform alignment conveyance unit 39, and is separated from a conveyance path of the preform alignment conveyance unit 39.

When the compressed air does not hit the fitted state preform P bounced off, the fitted state preform P does not become a state pinched between the rollers 63 in the upright posture, but is again conveyed toward the downstream side in an overturned posture on the rollers 63. In this case, the preforms P accumulate in front of the vicinity of the upstream side of the impeller 66. When the accumulating preforms P are left, the accumulating preforms P become an obstacle to preforms P conveyed in a stream. As a result, the plurality of preforms P accumulate in a mountain shape in front of the vicinity of the impeller 66, and it becomes necessary to once stop the preform supplying apparatus 13 and do work of manually removing the preforms P accumulated in the mountain shape. However, in the embodiment, the first air jet unit 100 is installed in front of the vicinity of the upstream side of the impeller 66 as described above. By this configuration, the optical sensor 100a of the first air jet unit 100 detects the preforms P accumulated in the overturned state on the rollers 63, and the air jet 100c blows off the accumulated preforms P toward the outlet guide member 150 according to an output signal from the optical sensor 100a. Thus, the first air jet unit 100 can separate the accumulated preforms P from the conveyance path of the preform alignment conveyance unit 39 and can prevent the plurality of preforms P from being accumulated in the mountain shape in front of the vicinity of the impeller 66.

Incidentally, the air jets 100c, 200c of the first air jet unit 100 and the second air jet unit 200, and the preform detection mechanisms are installed so that positions can be adjusted. There are cases where the above method does not achieve an alignment processing capability as designed, but in this case, the positions of the air jet 200c and the preform detection mechanism may be adjusted and the preform P may be removed by the second air jet unit 200 before the preform P reaches the impeller 66. Since this can solve an accumulated state in front of the impeller 66 due to the preforms P (particularly, the fitted state preform P) in a misaligned state, an improvement in the alignment processing capability can be expected.

Although the example of using the optical sensor having the light emitting element and the light receiving element as one example of the preform detection mechanism for detecting the presence or absence of the preform P has been described, the preform detection mechanism is not limited to this example, and may be, for example, a mechanism for detecting that the preforms P accumulate in front of the impeller 66 by measuring the weight of the accumulating preforms P, or a mechanism which has a bar-shaped accumulation detection switch making contact with the accumulating preforms P and detects that the preforms P accumulate according to switching of its switch.

Figure 9:
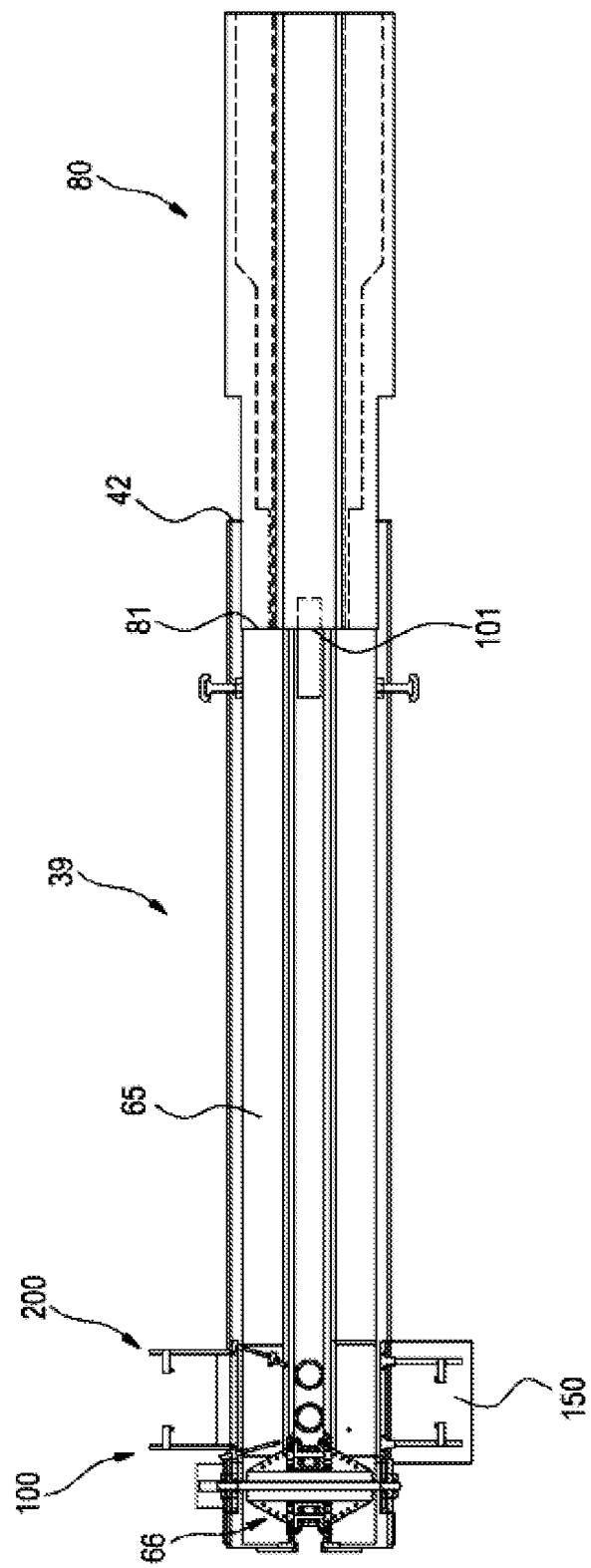
FIG. 9 is a plan view seeing a coupled state of the preform alignment conveyance unit and the alignment guidance chute from the upward side.

FIG. 9 is a plan view seeing a coupled state of the preform alignment conveyance unit 39 and the alignment guidance chute 80 from the upward side. As shown in FIG. 9, the portion of the outlet end 81 of the alignment guidance chute 80 is coupled to the upper portion of the inlet end 42 of the preform alignment conveyance unit 39 in an overlap state. Also, a plate-shaped member 101 having a slide surface on which the preform P slides down is installed from the downstream side end of the groove part 84b of the sheet member 84 of the alignment guidance chute 80 toward the gap between a pair of rollers 63. In the preform sliding down along the inner wall surface of the groove part 84b of the sheet member 84 in a state in which the bottom of the trunk 35 faces the rollers 63, the trunk 35 is guided to the gap between the rollers 63 through the plate-shaped member 101. As the plate-shaped member 101, for example, a flat plate made of a fluorine resin may be used. In addition, the upstream side end of the plate-shaped member 101 is arranged so as to be sandwiched between the alignment guidance chute 80 and the preform alignment conveyance unit 39, and FIG. 9 shows the sandwiched portion by a broken line.

Returning to FIG. 1, the reversing apparatus RM is coupled to the preform alignment conveyance unit 39. The reversing apparatus RM includes a first slide conveyor 45, a reversing unit 46, and a second slide conveyor 47. The first slide conveyor 45 includes a slide surface 48 inclined at a predetermined inclination angle. The slide surface 48 includes an inlet end 49 and an outlet end 51. The inlet end 49 is positioned at a position higher than the outlet end 51 in a direction of gravity. The slide surface 48 is connected to the outlet end 43 of the alignment path 41 at the inlet end 49. The slide surface 48 extends, for example, in one inclined plane. The slide surface 48 is divided into two pieces by an air gap extending from the inlet end 49 to the outlet end 51. The air gap extends in the same width between the mutual edges of the slide surfaces 48. The edges of the slide surfaces 48 are defined by straight lines extending in parallel mutually. A gap between the mutual slide surfaces 48 is set larger than an outside diameter of the trunk 35 of the preform P. However, the gap between the mutual slide surfaces 48 is that the flange 38 of the preform P is supported on the slide surfaces 48. The trunk 35 of the preform P is hung from the air gap. The preforms P can slide down on the first slide conveyor 45 one by one in an upright posture.

The reversing unit 46 is coupled to the first slide conveyor 45. The reversing unit 46 includes a rotor 52. The rotor 52 is rotated around a rotary shaft 53 inclined at a predetermined inclination angle. The inclination angle of the rotary shaft 53 of the rotor 52 is adapted to the inclination angle of the slide surface 48 of the first slide conveyor 45. The preform P in the upright posture is supplied from the first slide conveyor 45 to the rotor 52. The preform P is temporarily held in the rotor 52 in a prescribed direction. When the rotor 52 is rotated at a rotation angle of 180°, the posture of the preform P is reversed.

The second slide conveyor 47 is coupled to the reversing unit 46. The second slide conveyor 47 includes a slide surface 54. The slide surface 54 includes an inlet end 55 and an outlet end 56. The inlet end 55 is positioned at a position higher than the outlet end 56 in a direction of gravity. The slide surface 54 is inclined at a predetermined inclination angle at the inlet end 55. This inclination angle is adapted to the inclination angle of the rotary shaft 53 of the rotor 52. The slide surface 54 extends along a horizontal plane at the outlet end 56. Consequently, the slide surface 54 is gently curved from an inclined attitude to a horizontal attitude. The preform P in an inverted posture is supplied from the rotor 52 to the second slide conveyor 47. The preforms P can slide down on the second slide conveyor 47 one by one in the inverted attitude. In this manner, the preforms P in the inverted posture are passed to an apparatus of the next step such as a blow molding machine one by one.

As described above, according to the preform supplying apparatus 13 of the embodiment, the plurality of preforms P falling from the fall chute 90 on the alignment guidance chute 80 slide down toward the groove part 84b of the sheet member 84, and the preforms P received in the groove part 84b slide down toward the outlet end 81 on the inner wall surface of the groove part 84b. Since the groove part 84b has a substantially semi-cylindrical shape and has the width of the extent to which one preform is received while having a slight gap, the preform P slides down without colliding with (without interfering with) other preforms. In this case, a flow posture of the preform P is in a state in which the bottom thereof faces the outlet end 81 since the center of gravity is positioned to the side of the bottomed trunk 35 than the mouth part 36. That is, the flow posture of the preform P sliding down tends to be aligned in a state in which the bottom side (the gravity center side) of the preform faces the downstream side. In this manner, the plurality of misaligned preforms P falling are guided to the preform alignment conveyance unit 39 while the preforms P are aligned in a line and also the directions are aligned. In other words, the preform P sliding down is inhibited from being guided to the preform alignment conveyance unit 39 in the overturned state.

In addition, the embodiment illustrates the preform P with the wide-mouthed shape, and illustrates the sheet member 84 having the semi-cylindrical groove part 84b slightly larger than the shape of the mouth part 36 of the preform P, but is not limited to this example. The shape of the groove part 84b of the sheet member 84 may be a V shape or a recessed shape as long as the shape of the groove part 84b is the shape in which the preform P can fall smoothly without interfering with other preforms P. Any material of the sheet member 84 can be used as long as the material is the material in which the preform P can fall smoothly without interfering with other preforms P.

Also, the embodiment describes the example in which the sheet member 84 made of Teflon (registered trademark) is fixed on the plate-shaped member 83 made of stainless steel and a part of the sheet member 84 is downwardly bent along the groove part 83b of the plate-shaped member 83 to form the groove part 84b, but is not limited to this example. For example, a configuration shown in FIG. 10 may be adopted.

Figure 10:
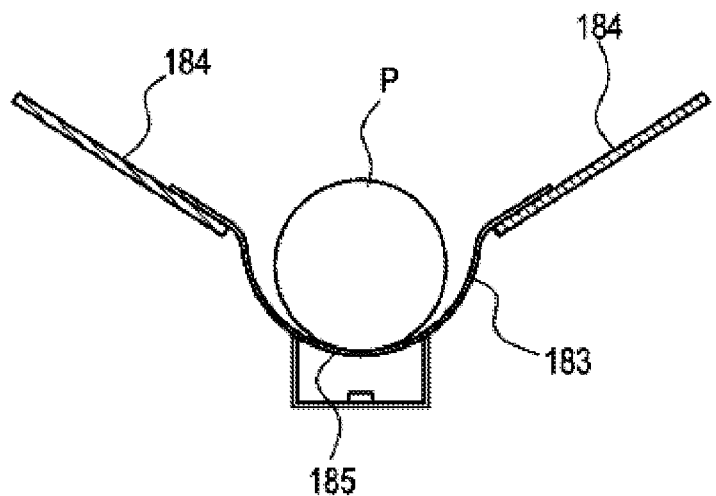
FIG. 10 is a view showing a modified example of the alignment guidance chute.

An alignment guidance chute shown in FIG. 10 includes a pair of plate-shaped members 184 (one example of a guide member) made of stainless steel, and a sheet member 183 (one example of a guide member) made of Teflon (registered trademark) fixed to the end of the air gap side of each of the plate-shaped members 184 so as to close an air gap formed between the pair of mutual plate-shaped members 184. Each of the plate-shaped members 184 is inclined so as to become low toward the air gap side described above. Both ends of the sheet member 183 are fixed to the plate-shaped members 184, and the portion for closing the air gap between the plate-shaped members 184 is formed in a downwardly bent shape.

The bent portion of the sheet member 183 is formed in substantially a semi-cylindrical shape to construct a groove part. A width of the air gap formed between the mutual plate-shaped members 184 is larger than the maximum outside diameter of the preform P but is smaller than two times the outside diameter of the mouth part 36. Consequently, inside substantially the semi-cylindrical groove part of the sheet member 183, one preform P is received while having a slight gap at both sides. Numeral 85 shows a support member 185 for supporting the sheet member 183 from the back side (surface which does not make contact with the preform P) of the sheet member 183. The alignment guidance chute shown in FIG. 10 is installed so as to become low toward the downstream side in a conveyance direction, and its groove part is formed along an inclination direction. Even when the groove part is formed in this manner, an effect similar to that of the embodiment described above can be obtained.

Figure 11:
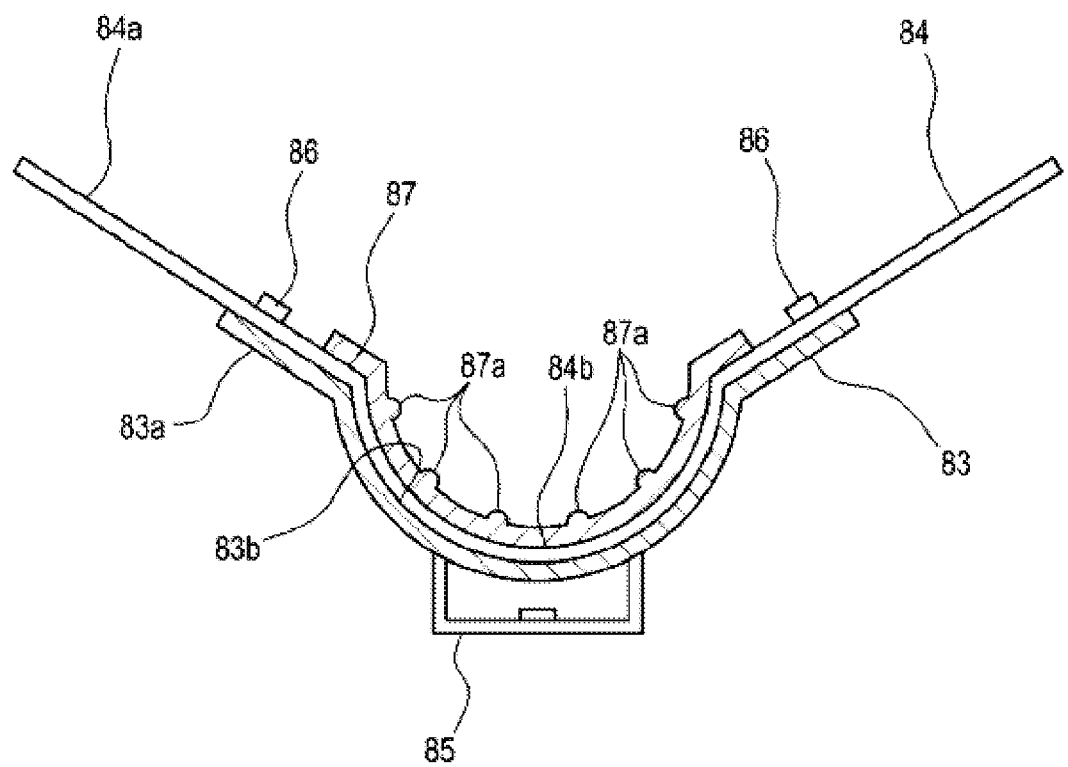
FIG. 11 is a view showing another modified example of the alignment guidance chute.

Also, as shown in FIG. 11, a tape member 87 may be stuck on the front side of the sheet member 84 of the alignment guidance chute 80 (side making contact with the preform P) along the groove part 84b of the sheet member 84. The tape member 87 could be stuck on the sheet member 84, for example, from the inlet end 82 to the outlet end 81 of the alignment guidance chute 80 along a conveyance direction of the preform P. In this tape member 87, a plurality of long projections 87a extending along the conveyance direction of the preform P are formed at a predetermined interval in a width direction of the tape member 87.

By forming the tape member 87 having the projections 87a on the sheet member 84, the area of contact between the tape member 87 and the preform P being conveyed is decreased. As a result, the preform P can be smoothly fallen toward the outlet end 81. Also, by the plurality of long projections 87b formed so as to extend in the conveyance direction, the preform P can be guided so that the bottom side (the gravity center side) of the preform P is turned to the downstream side. Thus, it is possible to suppress the preform P sliding down from being guided to the preform alignment conveyance unit 39 in an overturned state. In addition, even in a configuration where the tape member 87 is formed on the front side of the sheet member 183 as shown in FIG. 10, a similar effect can be obtained.

Also, a pair of rollers 63 of the preform alignment conveyance unit 39 extends in parallel mutually, and a gap is formed between the mutual rollers 63, and the size of its gap is set so as to convey the preform P while the rollers 63 pinch the trunk part of the preform P. Therefore, the rollers 63 can stably convey the preform P guided from the alignment guidance chute 80.

Also, the plate-shaped member 101 having the slide surface on which the preform slides down is installed from the downstream side end of the groove part 84b of the sheet member 84 toward a pair of rollers 63. In the preform P sliding down along the inner wall surface of the groove part in a state in which the bottom thereof faces the side of the rollers 63, the trunk 35 thereof is guided to the gap between the rollers 63 through the plate-shaped member 101, and therefore the trunk 35 can be smoothly shifted to a state where the trunk 35 pinched by the rollers 63 and is conveyed.

Also, the fall chute 90 is installed at the upper side of the vicinity of the upstream side end (inlet end 82) of the alignment guidance chute 80. The plurality of orientation pins 92a, 93a are arranged at the fall path of the preform P inside the cabinet 90a of the fall chute 90. When the plurality of misaligned preforms P conveyed from the inclined conveyor 57 pass through the inside of the cabinet 90a of the fall chute 90, the preforms P fall while colliding with the orientation pins 92a or other pins. Consequently, in the case of collision, the preforms P in a stacked state can be fallen on the alignment guidance chute 80 in a state in which its stacked state is dissolved and the preforms P become separate one by one.

Also, since a fall speed of the preform P becomes slow by collision with the pins, a collision sound generated in the case when the preform P falls on the alignment guidance chute 80 can be reduced. Here, it is not necessary that the orientation pins 92a, 93a should collide with all of the falling preforms P. For example, when the plurality of preforms P in a state of being accumulated in a mountain shape are conveyed from the inclined conveyor 57, the plurality of preforms P in the state of being accumulated in the mountain shape collide with the orientation pins 92a, 93a of the inside of the cabinet 90a before falling on the alignment guidance chute 80. Accordingly, the preforms P could fall on the alignment guidance chute 80 in a uniform and separate state to a certain extent.

Also, the preform alignment conveyance unit 39 has the first air jet unit 100 and the second air jet unit 200 in front of the vicinity of the upstream side of the impeller 66. When the preform P is conveyed in a stacked state or in an overturned posture and is bounced off by the impeller 66, the second air jet unit 200 can jet compressed air to blow off the preform P bounced off toward the outlet guide member 150. Also, when the plurality of preforms P start to accumulate in front of the vicinity of the upstream side of the impeller 66, the first air jet unit 100 can jet compressed air to blow off the accumulated preforms P toward the outlet guide member 150 to prevent the plurality of preforms P from being accumulated in a mountain shape.

Thus, according to the preform supplying apparatus 13 of the embodiment, since it is possible to prevent a mass of the preforms P from accumulating in the middle of the conveyance path by a plurality of means, even for a wide-mouthed preform P, the preform P can efficiently be supplied to a machine for the next step such as a blow molding machine in an aligned state.

Figure 12:
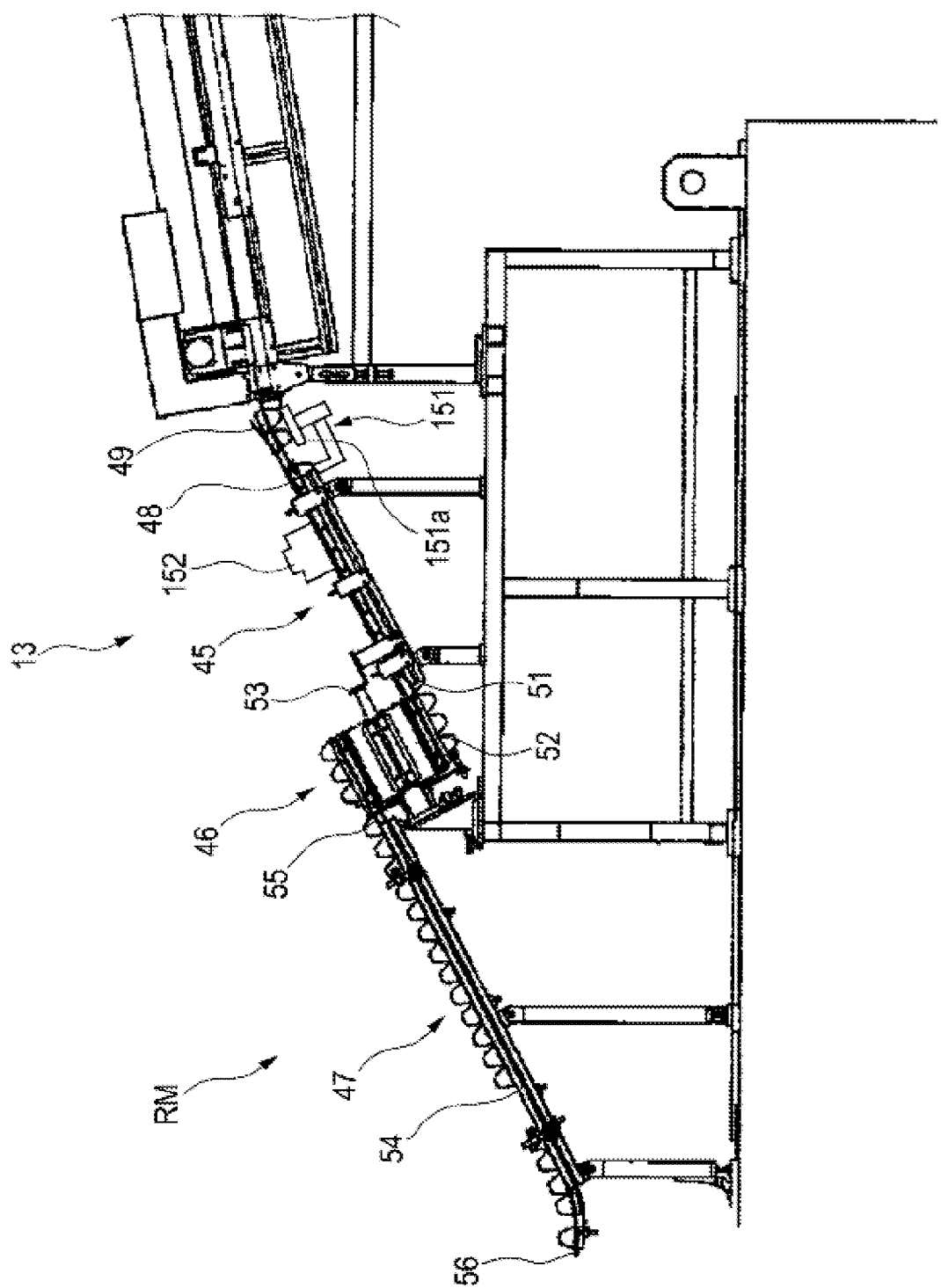
FIG. 12 is a view showing a modified example of a slide conveyor.

Also, as shown in FIG. 12, a cylinder mechanism 151 may be formed on the back side of the vicinity of the inlet end 49 of the first slide conveyor 45. The cylinder mechanism 151 has a pressing member 151a capable of moving between a pressing position and a standby position. The pressing position is a position in which the pressing member 151a can make contact with the preform P supported on the first slide conveyor 45. The standby position is a position lower than the pressing position and is a position in which the pressing member 151a does not reach the preform P. In the case of determining that the preform P has clogged at the upstream side of the first slide conveyor 45 according to an output of a preform check sensor (photoelectric sensor) provided in front of the reversing apparatus RM, the cylinder mechanism 151 moves the pressing member 151a to the pressing position and presses the bottom, etc., of the preform P in a clogging state from the downward side. Accordingly, it is prompted to clear clogging of the preform P. Also, in the case of determining that the preform is not clogged on the first slide conveyor 45, the cylinder mechanism 151 moves the pressing member 151a to the standby position.

By forming the cylinder mechanism 151 in this manner, it is possible to prompt clearing of the clogging state of the preform P in the vicinity of the inlet end 49 of the first slide conveyor 45.

Also, as shown in FIG. 12, a vibration mechanism 152 may be provided at, for example, the front side of the first slide conveyor 45 between the inlet end 48 and the outlet end 51. In the case of determining that the preform P clogs on the first slide conveyor 45 according to an output of a preform check sensor (photoelectric sensor) provided to the reversing apparatus RM, the vibration mechanism 152 vibrates the first slide conveyor 45. By this vibration, it is possible to prompt the clearing of the clogging state of the preform P on the first slide conveyor 45. Incidentally, the vibration mechanism 152 may always vibrate the first slide conveyor 45 regardless of the output of the preform check sensor (photoelectric sensor).

Since the posture of the preform P being conveyed is changed on the first slide conveyor 45 for coupling the preform alignment conveyance unit 39 to the reversing apparatus RM, the clogging state of the preform P tends to occur relatively. However, by providing at least one of the cylinder mechanism 151 and the vibration mechanism 152 to the first slide conveyor 45 as shown in FIG. 12, it becomes easy to clear the clogging state of the preform P occurring on the first slide conveyor. Also, this is particularly effective as a solution of the clogging since the preform with a small flange diameter tends to clog at this region, that is, in the vicinity of a point of change in an inclination angle.

The invention is not limited to the contents illustrated in the embodiment described above, and can be properly changed without departing from the gist of the invention.

The present application is based on Japanese patent application: patent application No. 2012-099253, filed on Apr. 24, 2012, and the contents thereof are hereby incorporated by reference.

DESCRIPTION OF REFERENCE NUMERALS AND SIGNS

39: preform alignment conveyance unit
63: roller
66: impeller
80: alignment guidance chute
83: sheet member
84: guide member
90: fall chute
92a, 93a: orientation pin
100: air jet part 101: plate-shaped member
P: preform

The invention claimed is:

1. A preform supplying apparatus comprising:
an alignment guidance chute having a guide member that slides a plurality of preforms under their own weight by inclination and guides the preforms to a preform alignment conveyance unit; and
the preform alignment conveyance unit that conveys the preforms guided from the alignment guidance chute in an aligned state,
wherein a groove part along an inclination direction is formed to the guide member and an inner wall surface of the groove part has a shape which causes the preforms sliding down inside the groove part to be aligned in a line,
wherein a fall chute, through which a preform conveyed from a container that stores a plurality of preforms falls and passes, is installed at an upper side of an upstream side end of the alignment guidance chute, and
wherein the fall chute has a pin that collides with the preform falling from an upper side.

2. The preform supplying apparatus according to claim 1, wherein the shape of the inner wall surface of the groove part is a semi-cylindrical shape.

3. The preform supplying apparatus according to claim 1, wherein the preform alignment conveyance unit has a pair of alignment rollers extending in parallel along a conveyance direction, and the pair of alignment rollers conveys a preform while supporting the preform by pinching a trunk part of the preform guided from the alignment guidance chute.

4. The preform supplying apparatus according to claim 3, wherein the alignment guidance chute has a plate-shaped member on which a preform slides down from a downstream side end of the groove part toward the alignment rollers.

5. The preform supplying apparatus according to claim 1, wherein the preform alignment conveyance unit has an air jet part that blows off a preform in a misaligned state to an outside of a conveyance path of the preform alignment conveyance unit.

6. The preform supplying apparatus according to claim 5, wherein an impeller that bounces off at least two or more preforms, which are conveyed while being stacked, to an upstream side is installed to a downstream side end of the preform alignment conveyance unit, and
wherein the air jet part blows off the preforms bounced off by the impeller to the outside of the conveyance path of the preform alignment conveyance unit.

7. A preform supplying apparatus comprising:
an alignment guidance chute having a guide member that slides a plurality of preforms under their own weight by inclination and guides the preforms to a preform alignment conveyance unit; and
the preform alignment conveyance unit that conveys the preforms guided from the alignment guidance chute in an aligned state,
wherein a groove part along an inclination direction is formed to the guide member and an inner wall surface of the groove part has a shape which causes the preforms sliding down inside the groove part to be aligned in a line,
wherein the preform alignment conveyance unit has an air jet part that blows off a preform in a misaligned state to an outside of a conveyance path of the preform alignment conveyance unit,
wherein an impeller that bounces off at least two or more preforms, which are conveyed while being stacked, to an upstream side is installed to a downstream side end of the preform alignment conveyance unit, and
wherein the air jet part blows off the preforms bounced off by the impeller to the outside of the conveyance path of the preform alignment conveyance unit.

8. The preform supplying apparatus according to claim 7, wherein the shape of the inner wall surface of the groove part is a semi-cylindrical shape.

9. The preform supplying apparatus according to claim 7, wherein the preform alignment conveyance unit has a pair of alignment rollers extending in parallel along a conveyance direction, and the pair of alignment rollers conveys a preform while supporting the preform by pinching a trunk part of the preform guided from the alignment guidance chute.

10. The preform supplying apparatus according to claim 9, wherein the alignment guidance chute has a plate-shaped member on which a preform slides down from a downstream side end of the groove part toward the alignment rollers.

* * * * *